United States Patent [19]
Kimura et al.

[11] 4,394,596
[45] Jul. 19, 1983

[54] THREE-PHASE INDUCTION MOTOR

[75] Inventors: Tadatomo Kimura, Yotsukaichi; Takeshi Noguchi, Mie, both of Japan

[73] Assignee: Tokyo Shibaura Denki Kabushiki Kaisha, Kawasaki, Japan

[21] Appl. No.: 300,553

[22] Filed: Sep. 9, 1981

[30] Foreign Application Priority Data

Sep. 16, 1980 [JP] Japan .................. 55-128309

[51] Int. Cl.³ .............................................. H02K 3/00
[52] U.S. Cl. .................................. 310/184; 310/198
[58] Field of Search ............ 310/180, 179, 184, 254, 310/198–208, 49

[56] References Cited

U.S. PATENT DOCUMENTS

| | | | |
|---|---|---|---|
| 2,046,992 | 7/1936 | Alger | 310/198 |
| 3,515,922 | 6/1970 | Fong | 310/198 |
| 4,095,161 | 6/1978 | Heine et al. | 310/49 R |
| 4,138,619 | 2/1979 | Broadway et al. | 310/198 |
| 4,315,171 | 2/1982 | Schaeffer | 310/49 R |

OTHER PUBLICATIONS

American Institute of Electrical Engineers, pp. 1248–1254, Ten Part–Winding Arrangements in Sample 4-Pole Induction Motor, J. J. Courtin, Dec. 1955.
American Institute of Electrical Engineers, pp. 1455–1463, A New Method for Part-Winding Starting of Polyphase Motor, P. L. Alger, Lorraine M. Agacinsky, Feb. 1955.

Primary Examiner—R. Skudy
Attorney, Agent, or Firm—Oblon, Fisher, Spivak, McClelland & Maier

[57] ABSTRACT

A rotating electric machine provided with coils of various phases constituting 3-phase armature winding which are divided into first and second groups or circuits. A first circuit formed of selected sub-groups of coils of various phases is energized at the start of the electric rotating machine. A second circuit is formed of the remaining coils of various phases which are so connected as to generate an induced electromotive force having an equal magnitude to that which is produced in the first circuit. Said second circuit is connected in parallel with the first circuit to be energized at the full drive of the rotating electric machine.

6 Claims, 13 Drawing Figures

FIG. 13

THREE-PHASE INDUCTION MOTOR

BACKGROUND OF THE INVENTION

This invention relates to a rotating machine, and more particularly to a rotating machine whose start is effected by actuating only some of the coils which are all energized during the full drive.

Various methods have been proposed for the start of a rotating machine such as an electric motor. These methods include the type which effects the start of a rotating machine by actuating only some of the coils attached to the machine. This method comprises dividing all the coils which are to be energized during the full drive into two or circuits groups and energizing one or the other of these two or circuit groups to effect the start of the rotating machine.

Figure 1:
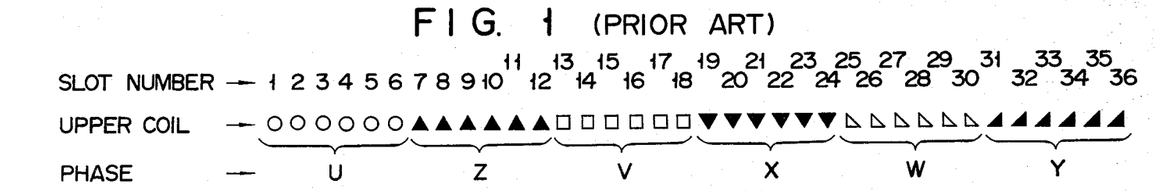
FIGS. 1 and 2 show the arrangement of coils of various phases used with a conventional 2-pole rotating electric machine of the 3-phase and 36-slot type, which is started by energizing some of said coils.
Figure 2:
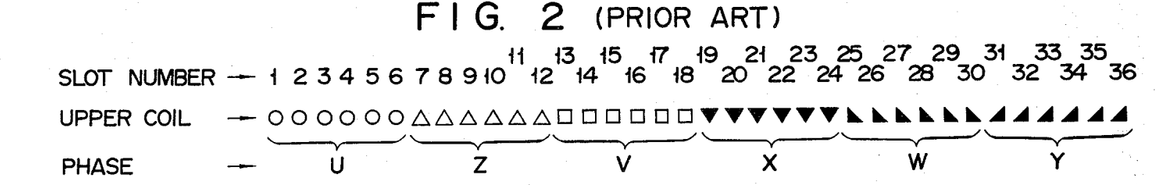

FIGS. 1 and schematically indicate the conventional method which starts a 3-phase 36-slot 2-pole electric motor by actuating only some of the coils used. In FIGS. 1 and 2, the characters 1 to 36 denote the serial slot numbers of a stator (not shown). Coils are received in the slots in six groups in the following manner:

Slots 1 to 6 hold the first group of U-phase coils marked with ○;
Slots 7 to 12 hold the second group of Z-phase coils marked with ▲;
Slots 13 to 18 hold the third group of V-phase coils marked with □;
Slots 19 to 24 hold the fourth group of X-phase coils marked with ▽;
Slots 25 to 30 hold the fifth group of W-phase coils marked with ◩;
Slots 31 to 36 hold the sixth group of Y-phase coils marked with ⊿;

Black marks given in FIGS. 1 and 2 denote the coils which are not energized at the start of a rotating machine. For briefness of illustration, FIGS. 1 and 2 indicate only the upper coils. The lower coils (not shown) are received in the corresponding slots in a state respectively displaced from the upper coils by a prescribed coil pitch.

The field winding of the electric motor of FIG. 1 is formed of U-, V- and W-phase coils so connected as to produce three magnetic fields spaced from each other at an electric angle of 60° (FIG. 6) as counted in the circumferential direction of a cylindrical stator. The field winding of the electric motor of FIG. 2 is formed of U-, Z- and V-phase coils so connected as to produce three magnetic fields arranged adjacent to each other on one segmental section of the cylindrical stator jointly to define an electric angle of 180° (FIG. 7).

Figure 3:
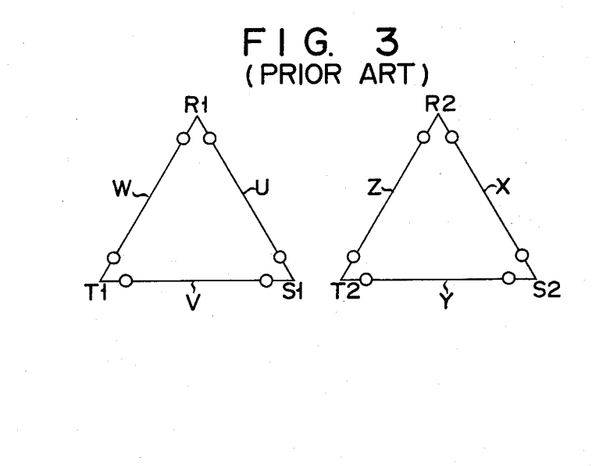
FIGS. 3 and 4 respectively typically illustrate the manner in which the coils of various phases of FIGS. 1 and 2 are connected together.
Figure 4:
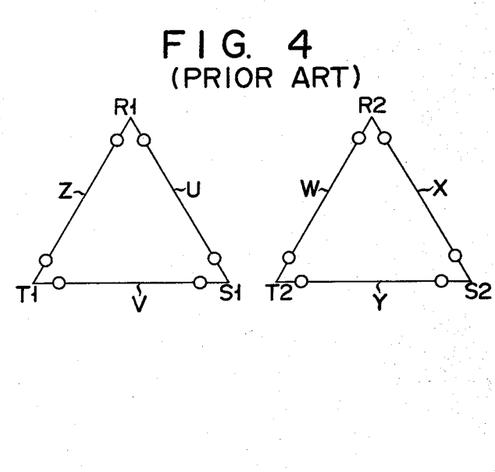

FIGS. 3 and 4 respectively typically illustrate the manner in which the coils of the various phases shown in FIGS. 1 and 2 are connected. In FIGS. 3 and 4, the characters $R_1$, $R_2$, $S_1$, $S_2$, $T_1$, $T_2$ denote terminals for connecting the coils of the various phases. 3-phase A.C. current is supplied to the coils through said contacts.

Figure 5:
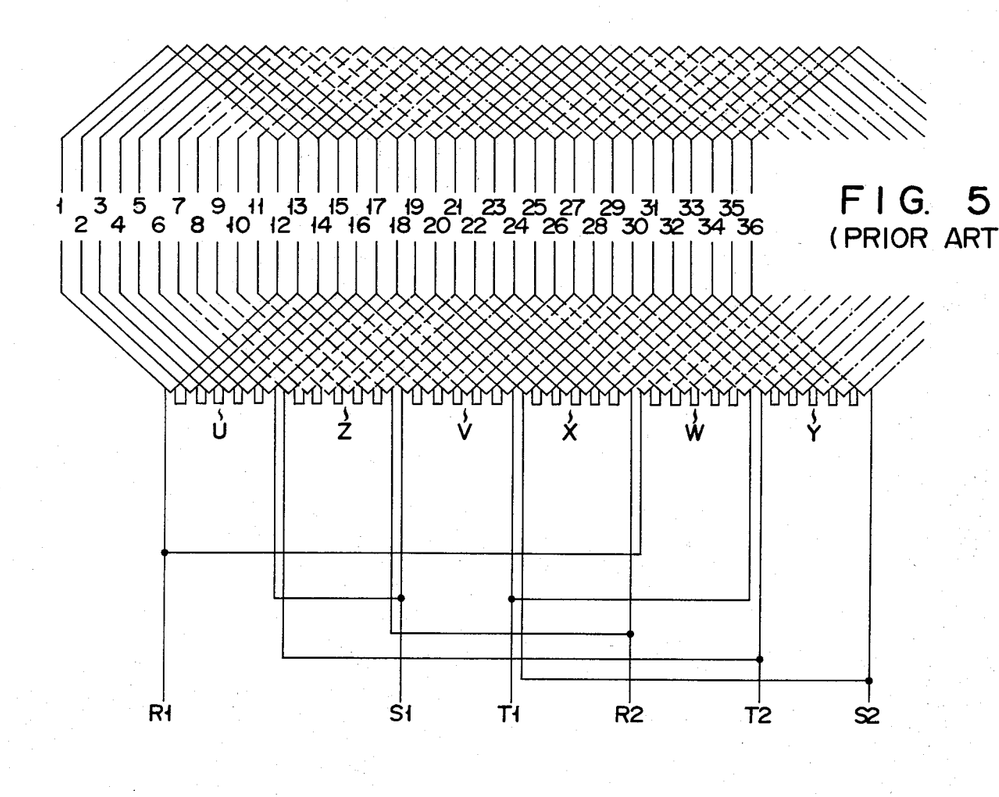
FIG. 5 is a development diagram of the coils held in the slots of the stator of the rotating electric machine of FIGS. 1 and 3.
Figure 6:
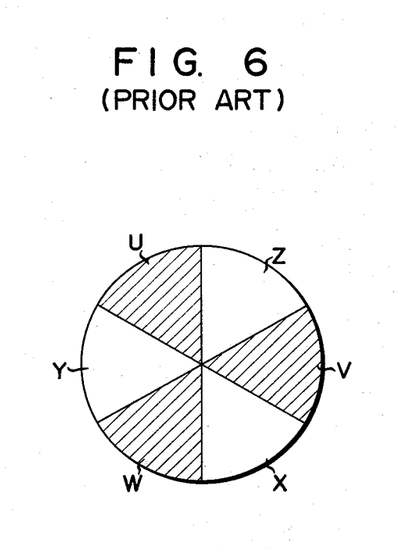
FIGS. 6 and 7 respectively indicate magnetic fields produces when the conventional electric motors of FIGS. 1 and 2 are started.
Figure 7:
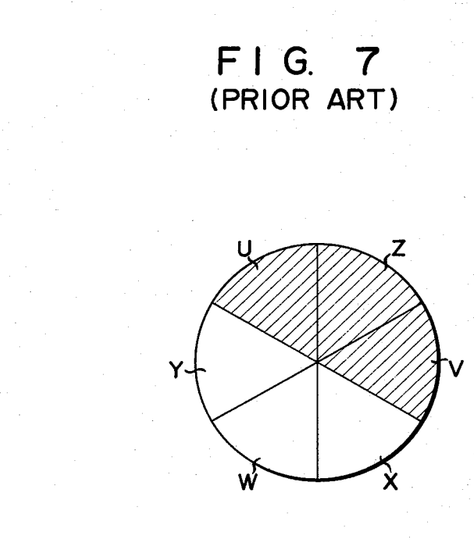

FIG. 5 is a development diagram of coils held in the slots of the stator of the electric motor of FIGS. 1 and 3. A development diagram of the coils of the respective phases held in the slots of the stator of the electric motor of FIGS. 2 and 4 is omitted, because said coils are connected only in a different manner from FIG. 5.

Where 3-phase A.C. current is supplied to the coils of the U-, V- and W-phases to start the motor of FIGS. 1, 3 and 5, then the A.C. current flows through the coils U, V and W as indicated by the hatchings of FIG. 6.

The remaining coils of the Z-, X- and Y-phases which are not supplied with the 3-phase A.C. current do not produce actual magnetic fields, but only imaginary ones. Each of these imaginary magnetic fields are formed by an opposite electromotive force induced by the magnetic fields generated by the coils of the U-, V- and W-phases, and have the opposite poles to those of the coils of the U-, V- and W-phases. At the start of the electric motor of the above-mentioned arrangement, the magnetic fields of U, V and W and imaginary magnetic fields Z, X and Y are produced. During the acceleration period after the start, therefore, an even harmonic magnetomotive force exerts a prominent effect on a fundamental harmonic magnetomotive force, eventually resulting in a decline in a magnetomotive force. Consequently a torque valley appears which results from a valley-like descent of a torque characteristic curve. Where said torque valley is positioned below a load torque, then the electric motor can not be accelerated.

A prior art electric motor in which the coils of the various phases are connected as shown in FIGS. 2 and 4 are accompanied with the drawbacks of a prior art electric motor described with reference to FIGS. 1 and 3. The hatching of FIG. 7 shows the coils which carry the A.C. current when 3-phase A.C. current is applied to the coils of the U-, Z- and V-phases of the electric motor of FIGS. 2 and 4. In this case, too, the actual magnetic fields U, Z, V and imaginary magnetic fields X, W, Y are produced, causing the even harmonic magnetomotive force to exert a noticeable effect on the fundamental harmonic magnetomotive force. Where, therefore, the resultant torque valley falls before the load torque, then the electric motor can not be accelerated as in the aforementioned case.

SUMMARY OF THE INVENTION

It is accordingly the object of this invention to provide a rotating electric machine, such as an electric motor whose start acceleration can be reliably effected by decreasing an effect exerted by the even harmonic magnetomotive force on the fundamental harmonic magnetomotive force and particularly by reducing a torque which is caused by a magnetomotive force corresponding four poles and is not synchronized with the fundamental harmonic magnetomotive force.

To attain the above-mentioned object, this invention provides a rotating electric machine which comprises:

a first circuit which is formed by connecting a first group of coils of various phases constituting 3-phase armature winding and energized at the start of the rotating electric machine; and a second circuit which is formed by connecting a second group of coils, is so arranged as to generate an induced electromotive force having an equal magnitude to that which is produced in the first circuit, and is set in parallel with the first circuit to be energized during the full drive of the rotating electric machine.

With a rotating machine embodying this invention which is constructed as described above, a magnetomotive force applied at the start of said rotating machine has such characteristic as approximates that which appears at the full drive of said machine in which all the magnetic fields are energized. Therefore, an effect exerted by the even harmonic magnetomotive force on the fundamental harmonic magnetomotive force is reduced. Consequently the torque valley is rendered shallow, and the bottom of said torque valley is prevented from falling below the load torque, thereby assuring start acceleration.

BRIEF DESCRIPTION OF THE DRAWINGS

By way of example and to make the description clearer, reference is made to the accompanying drawings, in which.

DETAILED DESCRIPTION OF THE PREFERRED EMBODIMENTS

Figure 8:
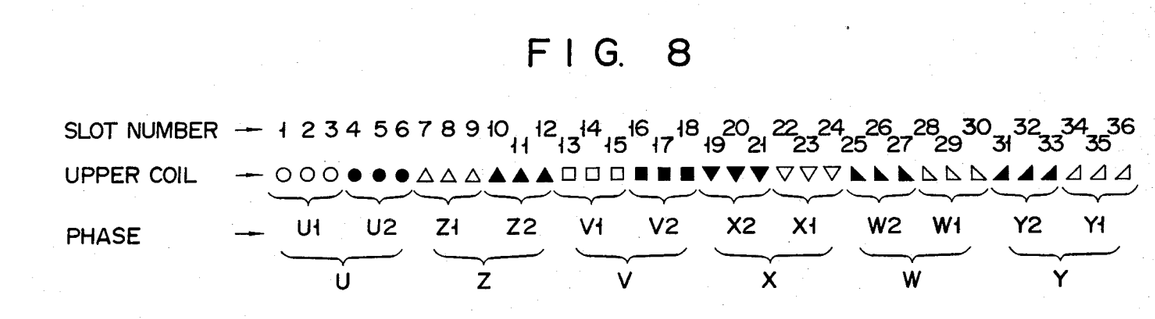
FIG. 8 shows the arrangement of coils used with an electric motor according to one embodiment of this invention, in which the coils of each phase are divided into two circuits, one of which is energized at the start of said electric motor and the other of which remains nonenergized at said start.
Figure 9:
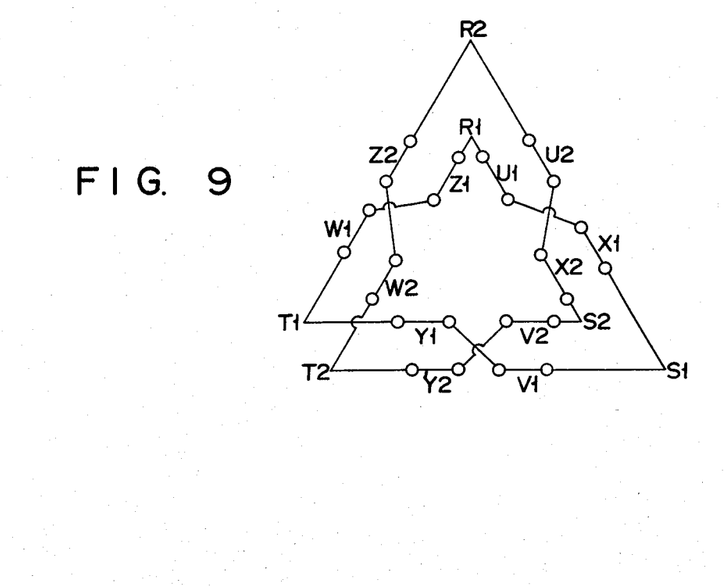
FIG. 9 typically illustrates the arrangement of the coils of the respective phases of FIG. 8 divided into two sub-groups.

FIG. 8 shows the manner in which the coils of each phase used with a 2-pole 3-phase 36-slot electric motor are arranged as groups U, Z, V, X, W and Y and are divided into two groups or circuits, one of which is energized at the start of said motor, and the other of which remains nonenergized at said start. To describe in detail, U-phase coils held in the slots 1 to 3 of a cylinderical stator (not shown) and constitute a first coil sub-group $U_1$ and U-phase coils held in the stator slots 4 to 6 constitute a second coil sub-group $U_2$. Similarly, the Z-phase coils held in the stator slots 7 to 12 are divided into a first sub-group $Z_1$ (held in the stator slots 7 to 9) and a second sub-group $Z_2$ (held in the stator slots 10 to 12). The V-phase coils held in the stator slots 13 to 18 are divided into a first sub-group $V_1$ (held in the stator slots 13 to 15) and a second sub-group $V_2$ (held in one stator slots 16 to 18). The X-phase coils held in the stator slots 19 to 24 are divided into a first group $X_1$ (held in the stator slots 22 to 24) and a second sub-groups $X_2$ (held in the stator slots 19 to 21). The W-phase coils held in the stator slots 25 to 30 are divided into a first sub-groups $W_1$ (held in the stator slots 28 to 30) and a second sub-groups $W_2$ (held in the stator slots 25 to 27). The Y-phase coils held in the stator slots 31 to 36 are divided into a first sub-groups $Y_1$ (held in the stator slots 34 to 36) and a second sub-groups $Y_2$ (held in the stator slots 31 to 33). In FIG. 8, the black marks denote the coils which are not energized when the electric motor is started. For briefness of illustration, FIG. 8 indicates only the upper coils. The lower coils (not shown) are displaced from the corresponding upper coils by a prescribed coil pitch. FIG. 9 shows the manner in which the divided sub-groups of coils of the respective phases are connected to constitute a coil assembly for the drive of an electric motor. The divided coil sub-groups $U_1$, $X_1$ are connected in series between the terminals $R_1$, $S_1$ of the first circuit. The divided coil sub-groups $V_1$, $Y_1$ are connected in series between the terminals $S_1$, $T_1$ of the first circuit. The divided coil sub-groups $W_1$, $Z_1$ are connected in series between the terminals $T_1$, $R_1$ of the first circuit. The divided coil sub-groups $U_2$, $X_2$ are connected in series between the terminals $R_2$, $S_2$ of the second circuit. The divided coil sub-groups $V_2$, $Y_2$ are connected in series between the terminals $S_2$, $T_2$ of the second circuit. The divided coil sub-groups $W_2$, $Z_2$ are connected in series between the terminals $T_2$, $R_2$ of the second circuit.

Figure 10:
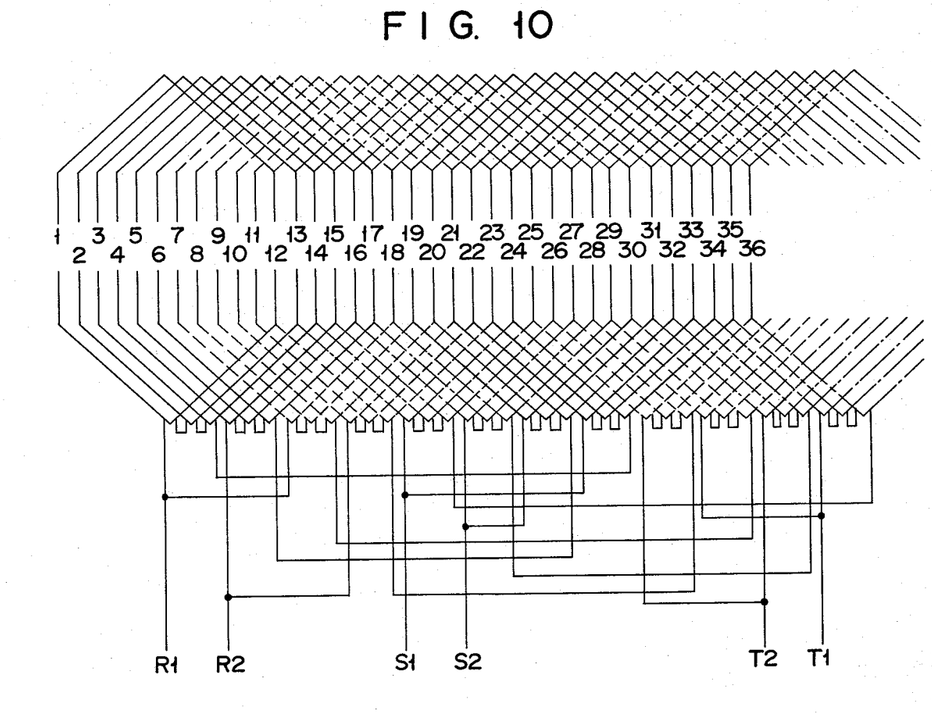
FIG. 10 is a development diagram of coils held in the slots of a stator of an electric motor of FIGS. 8 and 9.
Figures 11, 12:
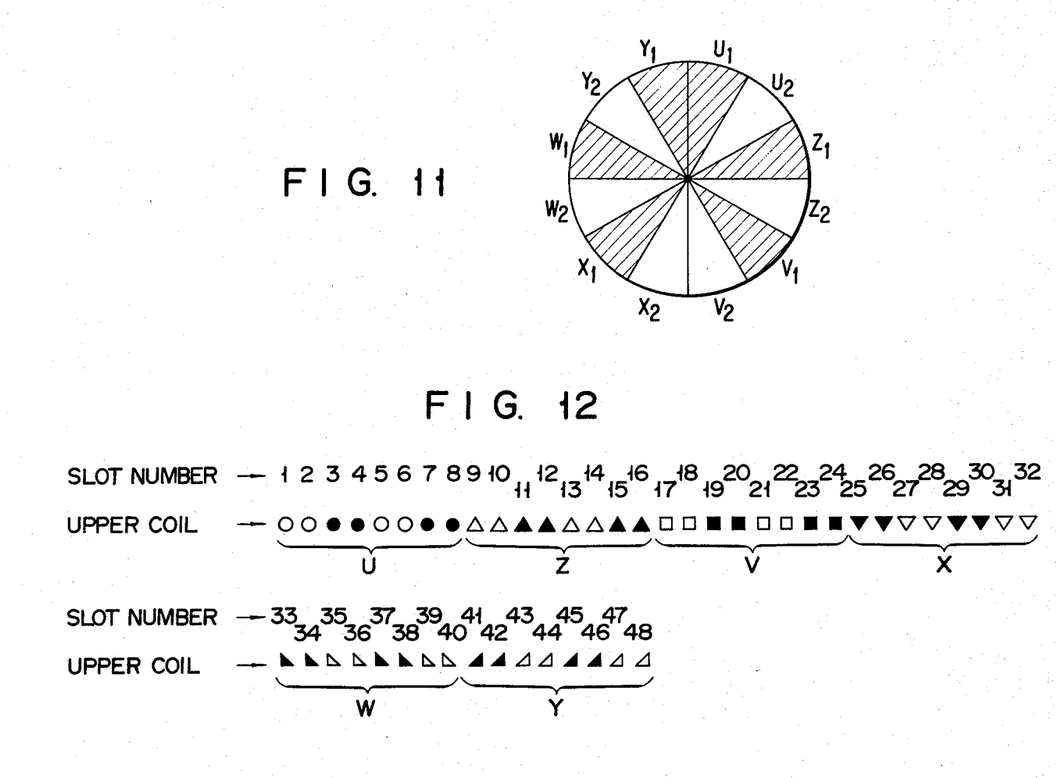
FIG. 11 shows the pattern of magnetic fields produced when the electric motor of FIG. 8 is started.
FIG. 12 indicates the arrangement of coils used with an electric motor according to another embodiment of the invention in which the coils of the respective phases are divided into two circuit, one of which is energized at the start of said electric motor and the other of which remains nonenergized at said start, though the individual coils are arranged in a different manner from FIG. 8.

FIG. 10 is a development diagram of the coils held in the slots of the stator of the electric motor of FIGS. 8 and 9. Description is now given of the operation of an electric motor of FIGS. 8 and 9 according to one embodiment of this invention which is constructed as described above. Where the electric motor of FIGS. 8 and 9 according to the first embodiment is started, 3-phase A.C. voltage is impressed on either the terminals group of $R_1$, $S_1$, $T_1$ or the terminals group of $R_2$, $S_2$, $T_2$ to energize the corresponding coils. FIG. 11 shows the arrangement of the respective divided sub-groups of coils $U_1$, $X_1$, $V_1$, $W_1$, $Z_1$ jointly constituting the first circuit which are energized at the start of the electric motor. In FIG. 11 the energized sub-groups of coils are indicated by hatching. After the start, the electric motor is fully driven by energizing all the coils of both first and second circuits. As seen from the foregoing description, the electric motor of FIGS. 8 and 9 according to the first embodiment of this invention is started by energizing half the number of coils used for the full drive of said motor. At the start, the energized coils produce approximately the same pattern of magnetic fields as that which appears at the full drive of the motor. Therefore, the magnetomotive force applied at the start of an electric motor indicates approximately the same characteristic as that which appears at the full drive of the motor effected by energizing all the coils. Consequently, the even harmonic magnetomotive force exerts a reduced effect on the fundamental harmonic magnetomotive force, thereby rendering the torque valley shallow, namely, preventing the bottom of said torque valley falling below the load torque and assuring the start acceleration.

Comparison was made between the calculated values of the high harmonic component of a magnetomotive force applied to the electric motor of FIG. 8 according to the first embodiment of this invention and those of the high harmonic component of a magnetomotive force applied to the conventional electric motors of FIGS. 1 and 2, the results being set forth in Table 1 below.

TABLE 1

| Components of a magnetomotive force corresponding to the total number of the S and N poles | Conventional electric motor of FIG. 1 | Conventional electric motor of FIG. 2 | Electric motor of FIG. 8 embodying this invention |
|---|---|---|---|
| 2 | 1.00 | 1.00 | 1.00 |
| 4 | −0.332 | −0.499 | * |
| 6 | * | * | * |
| 8 | 0.03 | 0.09 | * |
| 10 | −0.05 | −0.05 | −0.2 |
| 12 | * | * | * |
| 14 | 0.01 | 0.01 | 0.04 |
| 16 | 0.02 | −0.04 | * |
| 18 | * | * | * |
| 20 | * | * | * |
| 22 | −0.01 | −0.01 | −0.01 |
| 24 | * | * | * |
| 26 | * | * | * |
| 28 | −0.03 | −0.11 | * |
| 30 | * | * | * |
| 32 | * | * | * |

Calculation was made with respect to a 2-pole 36-slot electric motor in which the coil pitch was set at 62.2% and the fundamental harmonic component of a magnetomotive force was taken to be 1.00. The mark − preceding the numerals given in Table 1 above denotes that a magnetomotive force was rotated in the opposite direction to that in which the fundamental harmonic component was produced. The mark * shown in said Table 1 indicates that the component of the magnetomotive force was measured to be approximately zero. Table 1 above proves that with the electric motor constructed according to this invention, a component of a magnetomotive force corresponding to 4 poles is far more reduced than in the conventional electric motors.

With the foregoing embodiment, six coil groups were provided on the 1 pole-1 phase basis. However, this invention need not be limited to such arrangement. For instance, as shown in FIG. 12, it is possible to provide 8 coils on the 1 pole-1 phase basis. As in FIGS. 1, 2 and 8, the white marks given in FIG. 12 denote the coils which are energized at the start of the electric motor, and the black marks indicated therein represent the coils which remain nonenergized at the start of the electric motor.

Figure 13:
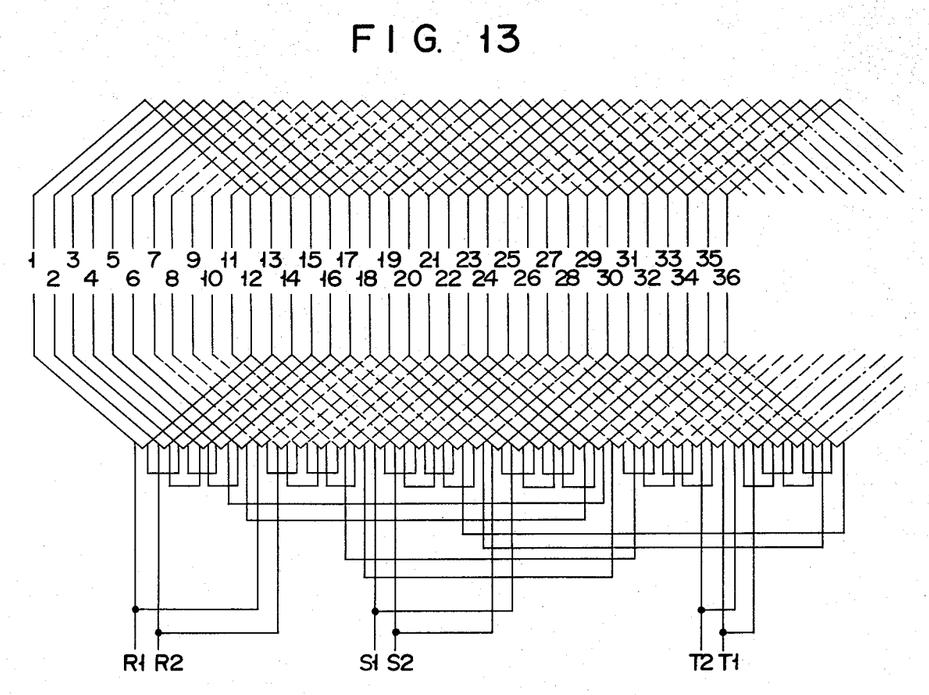
FIG. 13 is a development diagram of coils used with an electric motor modified from that of FIG. 10.

With the embodiment of FIGS. 8 and 9, the coils held in the stator slots bearing the numbers of, for example, 1, 2, 3 are connected in the same serial order, as shown in the development diagram of FIG. 10. However, this invention need not be limited to this arrangement. For instance, as shown in the development diagram of FIG. 13, the coils held in the stator slots bearing the numbers of, for example, 1, 3, 5 may be connected. In other words, the coils held in the alternate stator slots can be connected for each phase. Obviously, this invention can be practised in various modifications without departing from the object of the invention.

What we claim is:

1. A three-phase induction motor comprising:
   first to sixth phase terminals, said fourth to sixth phase terminals being connected to said first to third phase terminals, respectively, during full drive of the motor;
   a cylindrical stator core;
   six coil group arranged on the hollow cylindrical core at equal intervals in the circumferential direction of the stator;
   the coils of a first group being wound about a first one-sixth of the core and divided into first and second sub-groups each having N turns;
   the coils of a second group adjacent the first group being wound about a second one-sixth of the core and divided into third and fourth sub-groups each having N turns
   the coils of a third group adjacent the second group being wound about a third one-sixth of the core and divided into fifth and sixth sub-groups each having N turns
   the coils of a fourth group adjacent the third group being wound about a fourth one-sixth of the core and divided into seventh and eighth sub-groups each having N turns
   the coils of a fifth group adjacent the fourth group being wound about a fifth one-sixth of the core and divided into ninth and tenth sub-groups each having N turns;
   the coils of the sixth group adjacent the fifth group being wound about the last one-sixth of the core and divided into eleventh and twelfth sub-groups each having N turns,
   said sixth sub-group having M turns (M≦N) arranged adjacent M turns of the seventh sub-group, said first sub-group having M turns arranged adjacent M turns of said twelfth sub-group, said first and eighth sub-groups being connected in series between said first and second phase terminals to constitute a first subassembly of coils, said fifth and twelfth sub-groups being connected in series between said second and third phase terminals to constitute a second sub-assembly of coils, said tenth and third sub-groups being connected in series between said third and first phase terminals to constitute a third sub-assembly of coils, said second and seventh sub-groups being connected in series between the fourth and fifth phase terminals to constitute a fourth sub-assembly of coils, said sixth and eleventh sub-groups being connected in series between said fifth and sixth phase terminals to constitute a fifth sub-assembly of coils, and said ninth and fourth sub-groups being connected in series between said sixth and fourth phase terminals to constitute a sixth sub-assembly of coils,
   wherein at the start of the motor a first-phase voltage is applied to the first phase terminal, a second-phase voltage is applied to the second phase terminal and the third-phase voltage is applied to the third phase terminal, and during the full drive of the motor the first-phase voltage is applied to the first and fourth phase terminals, the second-phase voltage is applied to the second and fifth phase terminals and the third-phase voltage is applied to the third and sixth phase terminals, thus causing the first and fourth sub-assemblies to form a first assembly of coils, the second and fifth sub-assemblies to form a second assembly of coils and the third and fifth sub-assemblies to form a third assembly of coils, whereby three-phase voltage is applied to the coils of said first, third, fifth, eighth, tenth and twelfth sub-groups at the start of the motor and to all the sub-groups during the full drive of the motor.

2. A three-phase induction motor according to claim 1, wherein said cylindrical stator core has thirty-six slots.

3. A three-phase induction motor according to claim 2, wherein said thirty-six slots are divided into twelve groups each consisting of three slots for holding said first to twelfth sub-groups of coils, respectively, whereby said first sub-group of coils held in the first group of slots is adjacent the twelfth sub-group of coils held in the twelfth group of slots, and said sixth sub-group of coils held in the sixth group of slots is adjacent the seventh sub-group of coils held in the seventh group of slots, said sixth and seventh sub-groups of coils being positioned symmetrical to said first and twelfth sub-groups of coils with respect to the axis of said stator.

4. A three-phase induction motor according to claim 1, wherein the cylindrical stator core has fourty-eight slots.

5. A three-phase induction motor according to claim 4, wherein said fourty-eight slots are divided into six groups each consisting of eight slots, for holding said first to sixth groups of coils, respectively, every two slots holding half the number of coils of one sub-group and next sub-group so that half the number of coils of said first sub-group are arranged adjacent half the number of coils of said twelfth sub-group and half the number of coils of said sixth sub-group are arranged adjacent half the number of coils of said seventh sub-group, the four consecutive slots holding half the number of coils of the sixth sub-group and half the number of said seventh sub-group being arranged symmetrical to the four consecutive slots holding half the number of coils of said first sub-group and half the number of coils of said twelfth sub-group with respect to the axis of said stator.

6. A three-phase induction motor according to claim 2, wherein said thirty-six slots are divided into six groups each consisting of six slots, for holding said first to six groups of coils, respectively, every slot of each group holding a third the number of coils of one sub-group of each group and the next slot of the same group holding a third the number of coils of the other sub-group of the same group, so that a third the number of coils of said first sub-group are arranged adjacent a third the number of coils of said twelfth sub-group and a third the number of coils of said sixth sub-group are arranged adjacent a third the number of coils of said seventh sub-group, the two consecutive slots holding a third the number of coils of said sixth sub-group and a third the number of coils of said seventh sub-group being arranged symmetrical to the two consecutive slots holding a third the number of coils of said first sub-group and a third the number of coils of said twelfth sub-group with respect to the axis of said stator.

* * * * *